United States Patent

Ebnesajjad et al.

[11] Patent Number: 5,888,424
[45] Date of Patent: Mar. 30, 1999

[54] FLUORESCENT FLUOROPLASTICS

[75] Inventors: Sina Ebnesajjad, Chadds Ford, Pa.;
Vadim Leonidovitch Lichtchinski, Wilmington, Del.; Carmine Torardi, Wilmington, Del.; Robert Clayton Wheland, Wilmington, Del.

[73] Assignee: E. I. du Pont de Nemours and Company, Wilmington, Del.

[21] Appl. No.: 899,936

[22] Filed: Jul. 24, 1997

[51] Int. Cl.$^6$ .......................... C09K 11/00; C09K 11/54; C08K 3/10
[52] U.S. Cl. ................ 252/301.5; 252/301.6 R; 252/301.45; 524/413; 524/420; 524/430; 524/463
[58] Field of Search ........................ 252/301.5, 301.6 R, 252/301.45; 524/413, 420, 430

[56] References Cited

U.S. PATENT DOCUMENTS

| | | | |
|---|---|---|---|
| 3,953,412 | 4/1976 | Saito et al. | 526/250 |
| 5,166,236 | 11/1992 | Alexander et al. | 524/111 |
| 5,553,714 | 9/1996 | Cushman et al. | 524/87 |

FOREIGN PATENT DOCUMENTS

| | | |
|---|---|---|
| 60-115652 | 6/1985 | Japan . |
| WO94/05498 | 3/1994 | WIPO . |

*Primary Examiner*—Tae Yoon

[57] ABSTRACT

Fluoroplastics become identifiable as to source by incorporating 1 to 450 ppm of inorganic phosphor into the fluoroplastic which does not degrade the fluoroplastic upon processing at a temperature of 300° C. and does not discolor the fluoroplastic but does emit radiation which is characteristic of the phosphor when the fluoroplastic is exposed to excitation radiation.

12 Claims, No Drawings

FLUORESCENT FLUOROPLASTICS

FIELD OF THE INVENTION

This invention relates to the tagging of fluoropolymers so that the source of the polymer may be visually identifiable.

BACKGROUND OF THE INVENTION

U.S. Pat. No. 5,166,236 discloses the incorporation of 0.05 (500 ppm) to 5 parts of inorganic phosphor into 100 parts (by weight) of fluoroelastomer composition, but preferably 1 (10,000 ppm) to 2.5 parts of the phosphor, for such purpose as to identify (tag) the fluoroelastomer as to source or production lot history. The highest temperature to which the composition is exposed in preparation is 250° C., but often no more than 190° C., when the composition is cured after fabrication into the desired shape. The fluoroelastomer also contains added colorant (pigment) such as carbon black which colors the fluoroelastomer composition to the naked eye. The phosphor in the fluoroelastomer emits a color which is visible to the naked eye and is distinguishable from the colorant upon exposure of the composition to excitation radiation, i.e., radiation which causes the phosphor to emit it characteristic color.

There is a need for "tagging" non-elastomer fluoropolymers, i.e., fluoroplastics, which are free of added colorant, whereby the purity of the fluoroplastic is visible to the naked eye, and which are exposed to much higher processing temperatures than fluoroelastomers, e.g., at least 300° C. either in the melt fabrication of melt-fabricable fluoroplastics or 350° C. in the sintering of non-melt fabricable fluoroplastics, notably polytetrafluoroethylene. Such a high processing temperature also introduces the problem that even only small amounts of additives introduced into such fluoroplastics typically have the effect of causing the fluoroplastic to degrade during such processing, which can become evident from discoloration of the normal (no additive) appearance of the fluoroplastic. Another problem with using an additive in fluoroplastics, even if visible degradation during high temperature processing of the fluoroplastic does not occur, arises from the use of the fluoroplastic in critical chemical processing environments such as food processing and pharmaceutical and semiconductor manufacture where the fluoroplastic cannot contaminate the food or chemical processing fluid. For this reason, most fluoroplastic is produced "pure", i.e. consisting only of the fluoroplastic. A usual method for determining purity of the fluoroplastic in the field is to subject it to dielectric strength test (ASTM D149), because the dielectric strength of fluoroplastics is very sensitive to the presence of impurities (additives) in the fluoroplastic.

SUMMARY OF THE INVENTION

It has been discovered that fluorescent fluoroplastic can be produced without degradation of the polymer upon processing at a temperature of at least 300° C. and without detriment to the dielectric strength of the fluoroplastic, with the fluoroplastic emitting radiation when subjected to excitation radiation. In the preferred embodiment, the fluorescent composition consists essentially of the fluoroplastic which is free of added colorant and which is processed at the aforesaid temperature and at least one inorganic phosphor which when viewed in the visible light wavelength region (about 400–800 nm) provides no coloration of the fluoroplastic, but when exposed to excitation radiation, emits radiation which is characteristic of the phosphor, whereby the fluoroplastic is "tagged" by the phosphor, i.e., the fluoroplastic can be identified, e.g. as to its source by the radiation emitted from the composition.

Surprisingly, the high processing temperature of the fluoroplastic not only fails to degrade the fluoroplastic but also does not destroy the fluorescent quality of the phosphor. Additionally, the tagging can be achieved with very small amounts of the phosphor, e.g., as little as 0.5–10 ppm of the phosphor based on the weight of the fluoroplastic. Additionally, such minute amounts of the phosphor have a surprising beneficial effect on the physical properties of the fluoroplastic. The fluoroplastic also exhibits dielectric strength which is characteristic of pure fluoroplastic.

DETAILED DESCRIPTION OF THE INVENTION

Examples of fluoroplastics which can be "tagged" in accordance with the present invention include those which are partially crystalline and those which are amorphous and which are non-elastomeric, i.e. have little recovery after stretching, such as recovery of less than 10% after 100% elongation at room temperature. Examples of fluoroplastics include polytetrafluoroethylene (PTFE) granular and fine powder which have such a high melt viscosity that they have no appreciable flow at elevated temperature, whereby such polymer is not melt-fabricable. The PTFE can be a homopolymer or a modified homopolymer, wherein a small amount, e.g. less than 0.5 mol % of another monomer is copolymerized with the tetrafluoroethylene (TFE) to improve properties, without imparting melt fabricability to the resin. The processing of PTFE normally includes sintering which is typically carried out at temperatures of at least 360°–400° C. Additional fluroroplastics include polychlorotrifuoroethylene,melt-fabricable copolymers of TFE or chlorotrifluoroethylene (CTFE), such as copolymers of TFE with perfluoroolefin having 3 to 8 carbon atoms, such as hexafluoro-propylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms. Typically, it is a perfluoroolefin or PAVE monomer that is used to form the modified homopolymer described above. The melt-fabricable copolymer is made by incorporating a greater amount of the comonomer into the copolymer, e.g., to provide a copolymer which has a melt flow rate of about 1–100 g/10 min as measured according to ASTM D-1238 at the temperature which is standard for the resin. Additional melt-fabricable fluoroplastics are the copolymers of ethylene with TFE or CTFE and polymers of polyvinylidene fluoride, including copolymers. The melt-fabricable TFE and CTFE copolymers are typically fabricated by a melt extrusion process, such as extrusion of elongated shapes or injection molding, which require fabrication temperatures of at least 300° C., and these copolymers contain at least 35 wt. % fluorine.

The fluoroplastics are free of added colorant and/or other additives, except for the inorganic phosphor used in accordance with the present invention. Thus, it is the natural color of the fluoroplastic that is visible to the naked eye, which color ranges from opaque white to translucent white depending on the polymer and its thickness, and colorless for amorphous fluoroplastic. It is critical that this natural color not be affected by any taggant added to the fluoroplastic, either before exposure to high temperature processing or after such exposure, because the different color of the resin implies a defect in the resin. Thus, upon exposure to processing temperature, the fluorescent fluoroplastic should not be discolored by the inorganic phosphor, because that would be indicative of degradation of the resin. Such degradation can be present even without discoloration of the resin, and can be determined by thermal gravimetric analysis (TGA) for weight loss of polymer and DSC analysis for any increase in heat of crystallization. TGA curves of tagged and "virgin" polymers are essentially the same indicating that taggants don't contribute to fluoropolymer degradation. First heat of fusion as measured by DSC does not noticeably change. It is well known for example that such impurities (additives) in fluoroplastics as iron oxide and silicon oxide cause degradation of the fluoroplastic upon exposure to processing temperature.

Inorganic phosphors have been found by the present invention not to discolor the fluoroplastic in the small amounts needed to provide fluorescence, not to lose the ability to fluoresce when exposed to the fluoroplastic processing temperature of at least 300° C., and not to degrade the fluoroplastic. Additionally, such small amounts of the phosphor have a surprising beneficial effect on the physical properties of the fluoroplastic and are not detrimental to dielectric strength as shown in Example 1.

The phosphor when incorporated into the fluoroplastic composition, is preferably insensitive to exposure to light in the visible wavelength region but is sensitive to exposure to radiation at shorter wavelengths to fluoresce in the visible region or infrared region so that the color of the emitted radiation is visible to the naked eye or detectable by IR, respectively. Preferably the phosphor is sensitive to UV radiation, i.e. radiation having a wavelength in the region of 200 to about 400 nm.

The phosphors contain both an inorganic salt or oxide and an activator in chemical combination (the activator is part of the salt or oxide crystal structure) and are commercially available. Examples of inorganic salts and oxides include the salts and oxides of elements of Groups 2, 3, 12 and 13 of the Periodic Table (IUPAC format), such as zinc, calcium, barium, yttrium, gadolinium, magnesium, strontium, and lanthanum. The salt groups include sulfides, tungstate, aluminate, silicate, and phosphate. Any phosphor can be used, which does not discolor or degrade the fluoroplastic, which is insensitive to visible light, and which emits a color (when exposed to excitation radiation) which is different from that of the fluoroplastic. Mixed salts can also be used, e.g., (Zn,Cd)S. In addition to the inorganic phosphor in the fluoroplastic emitting fluorescence when exposed to excitation radiation, the phosphor may also emit phosphorescence when the excitation radiation is discontinued.

The activator component of the phosphor is typically a metal. Examples of metals include silver, copper, zinc, europium, terbium, lead, tin, manganese, cerium, titanium, and niobium, and mixtures thereof. The combination of the activator with the inorganic salt or oxide determines the color of the fluorescence and the wavelength at which the fluorescence occurs. Thus, the combination of ZnS and Ag gives a blue fluorescence, while the combination of ZnS with both Cu and Al gives a green fluorescence. Examples of inorganic phosphors that can be used in the present invention are shown in Table 1.

TABLE 1

Representative Inorganic Phosphors.

| N | Phosphor/Activator | Color |
|---|---|---|
| 1 | $BaSi_2O_5/Pb$ | UV |
| 2 | $SrB_4O_7/Eu$ | UV |
| 3 | $SrB_6O_{10}/Pb$ | UV |
| 4 | $Ce(Ba,Mg)Al_{11}O_{19}/Ce$ | UV |
| 5 | $CaWO_4/Pb$ | blue |
| 6 | $CaWO_4$ | blue |
| 7 | $Sr_2P_2O_7/Sn$ | blue |
| 8 | $Ca_5F(PO_4)_3/Sb$ | blue |
| 9 | $MgWO_4$ | blue |
| 10 | $Sr_5Cl(PO_4)_3/Eu$ | blue |
| 11 | $Sr_2P_2O_7/Eu$ | blue |
| 12 | $(Sr,Ca,Ba)_5(PO_4)_3Cl/Eu$ | blue |
| 13 | $Sr_3(PO_4)_2/Eu$ | blue |
| 14 | $Ba_3(PO_4)_2/Eu$ | blue |
| 15 | $(Ba,Ti)_2P_2O_7/Ti$ | blue |
| 16 | $Y_2SiO_5/Ce$ | blue |
| 17 | $ZnS/Ag$ | blue |
| 18 | $BaMg_2Al_{16}O_{27}/Eu$ | deep blue |
| 19 | $BaMgAl_{10}O_{17}/Eu$ | deep blue |
| 20 | $Ca_3(F,Cl)(PO_4)_3/Sb:Mn$ | white or blue |
| 21 | $(Ca,Mn)_{10}(F,Cl)_2(PO_4)_6/Sb$ | white |
| 22 | $(blend)ZnS/Ag$ | white |
| 23 | $ZnS/Mn:Cu + ZnS:Cu$ | white |
| 24 | $(Ce,Tb)MgAl_{11}O_{19}/Ce:Tb$ | green |
| 25 | $ZnS/Cu:Al$ | green |
| 26 | $Zn_2SiO_4/Mn$ | green |
| 27 | $ZnS/Cu:Al:Au$ | green |
| 28 | $Gd_2O_2S/Tb$ | green |
| 29 | $ZnS/Cu$ | green |
| 30 | $ZnO/Zn$ | green |
| 31 | $(Zn,Mg,Mn)_2SiO_4/Pb$ | green |
| 32 | $(Zn,Cd)S/Cu:Al$ | green |
| 33 | $(La,Ce,Tb)PO_4/Ce:Tb$ | green |
| 34 | $Y_3(Al,Ga)_5O_{12}/Ce$ | yellow-green |
| 35 | $Y_3(Al,Ga)_5O_{12}/Tb$ | yellow-green |
| 36 | $Sr_5F(PO_4)_3/Sb:Mn$ | yellow-green |
| 37 | $Sr_3(F,Cl)(PO_4)_3/Sb:Mn$ | yellow-green |
| 38 | $(Zn,Ca)_2SiO_4/Mn$ | yellow |
| 39 | $Y_3Al_5O_{12}/Ce$ | yellow |
| 40 | $(Zn,Cd)S/Ag$ | yellow |
| 41 | $Ca_5F(PO_4)_3/Sb:Mn$ | yellow |
| 42 | $ZnS/Mn:Cu$ | yellow |
| 43 | $(Sr,Mg)_3(PO_4)_2/Sn$ | orange |
| 44 | $CaSiO_3/Pb:Mn$ | orange |
| 45 | $Mg_4(F)(Ge,Sn)O_6/Mn$ | red |
| 46 | $YVO_4/Eu$ | red |
| 47 | $Y_2O_2S/Eu$ | red |
| 48 | $Y_2O_3/Eu$ | red |
| 49 | $Mg_4(F)GeO_6/Mn$ | red |
| 50 | $YVO_4/Nd$ | IR(880nm) |

The fluorescent fluoroplastics of the present invention can be prepared by having the fluoroplastic in a particulate form and simply blending the phosphor with the fluoroplastic. This blending can be done with the aid of a liquid medium or can be done dry, e.g., a shaker or a tumbler can be used to disperse the phosphor into the fluoroplastic. Melt blending can be used in place of wet or dry blending or to follow wet or dry blending to permanently combine the phosphor with the fluoroplastic. The amount of phosphor should be 0.5 to 450 ppm, but usually no more than 200 ppm is needed to obtain the fluorescence needed for detection such as by visual identification of the fluoroplastic. Preferably, the amount of phosphor used is only 1 to 100 ppm based on the weight of the fluoroplastic, and more preferably 1 to 10 ppm. Blends of fluoroplastic and higher concentrations of phosphor can be prepared as a masterbatch for eventual dilution by blending with pure fluoroplastic to obtain the dilute phosphor compositions described.

In accordance with one embodiment of the present invention, a plurality of phosphors are incorporated into the fluoroplastic by such as procedures described above and in the total amounts falling within the above disclosed ranges except the preferred range for two phosphors is 2 to 20 ppm and for three phosphors is 3 to 30 ppm. In this embodiment, each phosphor, whether two or three or more, fluoresces upon exposure to their respective wavelengths of excitation radiation in the invisible region. The excitation radiation can be the same or different wavelengths of radiation. When the excitation radiation is different wavelengths, the emitted color at each such wavelength can be the same or different. When the excitation wavelength is the same for more than one phosphor, the emitted color will be a blend of the fluorescence produced at such wavelength of radiation exposure. The identification of the source of the fluoroplastic in this embodiment requires knowledge of the excitation wavelengths of radiation to be used, making it difficult for a copier to produce the same fluorescence pattern in counterfeit fluoroplastic.

The radiation source is selected to provide the wavelength of photonic radiation which excites the phosphor, such that it emits its characteristic radiation for detection. Preferably the emitted radiation is observable as color which is visible to the naked eye. Preferably the radiation source provides such wavelength and radiation intensity which is effective to cause the phosphor in the fluoroplastic to emit sufficient radiation so that it is detectable, preferably visually in the visible wavelength region.

EXAMPLE 1

Pelletized PTFE granular-type of resin (average particle size of 575 micrometers) is mixed in separate experiments in a tumbler with 1 to 150 ppm of phosphors 15, 17, 18, 25, 26, 38, 44, 48, and 49 (Table 1). These phosphors have an average particle size of 10–30 micrometers and are composed of inorganic compound and activator. The resultant blends fluoresce blue, green, yellow, orange, or red in the visible region depending on the phosphor used when exposed to UV-radiation of 254, 302, or 365 nm wavelength using UVP Company (Upland, CA 91786, U.S.A.) lamps UVL-28 (365 nm), UVM-28 (302 nm), and UVS-28 (254 nm). The fluorescence is easily seen with the naked eye. The blends are also compression molded into billets and sintered at 370° C. for 20 hours (ASTM D4894) with no noticeable loss of fluorescence when the billets (having 1 to 150 ppm of the phosphor) are exposed to the same radiation. The billets are not discolored. A representative number of samples from these billets containing phosphors 15, 17, 18, 26, and 48 is tested by TGA and no weight loss was observed. First heat of fusion as measured by DSC does not noticeably change. Standard Specific Gravity (SSG) does not change with the addition of the taggant, further indicating absence of degradation of the PTFE in the sintered billets. Additionally, such small amounts of the phosphor have a surprising beneficial effect on the physical properties of the fluoroplastic as shown for a representative phosphor in Table 2. Tensile strength (TS) increases with phosphor concentration rising from 0 to 100 ppm.

TABLE 2

Physical properties of tagged PTFE granular.

| Sample | Taggant | Amount, ppm | TS, psi (Mpa) ASTM D4894 |
|---|---|---|---|
| 1 | green 26 | 100 | 5569 (38.4 Mpa) |
| 2 | green 26 | 10 | 5685 (39.2 Mpa) |
| 3 | green 26 | 0 | 5219 (36.0 Mpa) |

Ten-mil (0.0254 cm) thick films are made of sintered PTFE containing phosphors 15, 17 and 49 and tested for dielectric strength in accordance with the procedure of ASTM D149. For the composition containing 0, 1, 10 and 100 ppm of phosphor 17, the dielectric strength is 1242, 1320, 1307, and 1196 V/mil (V/0.0254 mm), respectively. For the composition containing phosphor 15, the dielectric strength is 1327, 1198, 1152 V/mil (V/0.0254 mm) for 1, 10, and 100 ppm, respectively, of the phosphor. For the composition containing phosphor 49, the dielectric strength is 1267 V/mil (V/0.0254 mm) at both the 10 and 100 ppm level and 1057 volts/mil at the 1000 ppm level. All of these dielectric strength test results at the amounts of 100 ppm and below are considered satisfactory from the standpoint of indicating satisfactory purity of the fluoroplastic.

EXAMPLE 2

Separate samples of PTFE fine powder-type of resin are tagged with phosphors 15, 26, 38, and 44 (Table 1). Inorganic phosphors are mixed (dispersed) with Isopar® G lubricant. The dispersed material is added to the PTFE fine powder-type of resin via pouring the measured amount of Isopar G with phosphor into jars of weighed fluoropolymer. The components are: 1000 g of fluoropolymer, 18% by weight Isopar G, and 0.5% by weight inorganic phosphor. The blends are then rolled for 15 minutes and aged for 24 hours. Tubing is made in a paste extruder (Davis®, 2 ½in (63.5 cm) barrel) at a reduction ratio of 1130:1. Tubing rate is 37 fpm (11.28 m/min) at a ram rate of 0.155 ipm (0.394 cm/min). Pressure of extrusion ranges from 7300–7800 psi, (50.4–53.8 Mpa) fairly constant by process standards. Extruded and sintered material have the same appearance as control fluoropolymer without phosphor material. The fluorescence observations are the same as described in Example 1.

EXAMPLE 3

Phosphor 26 is blended into an aqueous dispersion of PTFE. Then a 3 mil (0.076 mm) film is cast onto a Pyrex brand glass plate, which is then dried at 125° C. for 30 min, and exposed to sintering in an oven at 380° C. for 10 min. Upon cooling to room temperature, removal of the film from the glass plate, and exposure of the film to the radiation source of 254 nm (Example 1) the film fluoresces green. This experiment is repeated using phosphor 48, and the fluorescence is red in color when the film was exposed to the same source of radiation. The film in each experiment is not discolored by the phosphor, and the fluorescence is plainly visible with as little as 1–10 ppm of phosphor in each experiment.

EXAMPLE 4

TFE/HFP copolymer is blended with the green phosphor 26 and red phosphor 48 (emits green or red light when exposed to the UV excitation radiation) to form a masterbatches containing 200 ppm of the phosphor. This is done by first dry blending 1.8 g of the phosphor with 200 g of the copolymer in powder form, by tumbling in a polyethylene jar. This powder blend is then blended with 6.81 kg of copolymer pellets first by tumbling and then by melt extrusion in a 3.175 cm Egan® extruder at an extrusion temperature of 330° C. into pellets, which do not show any discoloration. Exposure of these pellets to the UV light source of Example 1 causes the pellets to emit a green or red color depending on the phosphor used. This masterbatch can be further blended with additional TFE/HFP copolymer, e.g., in 1–5 wt % amounts to form fluorescent TFE/HFP copolymer compositions containing 1 to 10 ppm of the phosphor which exhibit similar fluorescence.

EXAMPLE 5

Repetition of the procedure of Example 4, but using TFE/PAVE copolymer (copolymer of TFE with perfluoro (propyl vinyl ether)) and an extrusion temperature of 370° C. gives the same result.

EXAMPLE 6

Repetition of the procedure of Example 4, but using TFE/E copolymer and an extrusion temperature of 325° C. gives the same result.

EXAMPLE 7

Repetition of the preceding Examples, but using both phosphors 25 and 26 in each polymer, provides processed articles which emit green light both at 254 nm and 366 nm wavelengths of excitation radiation, the amount of each phosphor present in an article made from each polymer being 10 ppm. Repetition of the blending procedure using green phosphors 25 and 26 plus red phosphors 48 or 49 gives molded articles which emit green and red light respectively when exposed to UV-radiation 254 nm, 302 nm, and 365 rum. The combination of green phosphor 25 and red phosphor 48 is preferable due to better colors discrimination, i.e. red/orange at 254 nm and green at 302 nm. The sources of UV-radiation are the same as in Example 1.

What is claimed is:

1. Fluorescent fluoroplastic, said fluoroplastic being free of color other than provided by said fluoroplastic and being free of discoloration when processed at a temperature of at least 300° C., said fluoroplastic emitting radiation when subjected to excitation radiation and containing at least one inorganic phosphor which provides said emitted radiation.

2. The fluorescent fluoroplastic of claim 1 wherein said fluoroplastic consists essentially of said fluoroplastic and said inorganic phosphor.

3. The fluorescent fluoroplastic of claim 2 wherein said fluoroplastic is melt-fabricable tetrafluoroethylene or chlorotrifluoroethylene copolymer.

4. Fluorescent polytetrafluoroethylene, said polytetrafluoroethylene being free of color other than provided by said fluoroplastic and being free of discoloration when processed at a temperature of at least 300°, said fluoroplastic emitting radiation when subjected to excitation radiation and containing at least one inorganic phosphor which provides said emitted radiation.

5. The fluorescent polytetrafluoroethylene of claim 4 wherein the amount of said inorganic phosphor present in said fluorescent polytetrafluoroethylene is 0.5 to 450 ppm based on the weight of said polytetrafluoroethylene.

6. The fluorescent polytetrafluoroethylene of claim 5 wherein said amount is 1 to 100 ppm.

7. The fluorescent polytetrafluoroethylene of claim 4 wherein said excitation radiation is ultraviolet.

8. The fluorescent fluoroplastic of claim 1 wherein the amount of said inorganic phosphor present in said fluorescent fluoroplastic is 0.5 to 450 ppm based on the weight of said fluoroplastic.

9. The fluorescent fluoroplastic of claim 8 wherein said amount is 1 to 100 ppm.

10. The fluorescent fluoroplastic of claim 1 containing a plurality of said inorganic phosphors which are excited by said incident radiation at either the same or different wavelength.

11. The fluorescent fluoroplastic of claim 10 wherein the total amount of said inorganic phosphors present is 1 to 100 ppm.

12. The fluorescent fluoroplastic of claim 11 wherein said total amount is 1 to 20 ppm.

* * * * *